(12) United States Patent
Nakazumi et al.

(10) Patent No.: US 9,276,508 B2
(45) Date of Patent: Mar. 1, 2016

(54) INVERTER DEVICE FOR DRIVING ELECTRIC MOTOR

(71) Applicants: KOBELCO CONSTRUCTION MACHINERY CO., LTD., Hiroshima-shi (JP); SINFONIA TECHNOLOGY CO., LTD., Minato-ku (JP)

(72) Inventors: Akira Nakazumi, Hiroshima (JP); Yusuke Kamimura, Hiroshima (JP); Hiroyuki Suminaga, Tokyo (JP); Takeshi Tomizaki, Tokyo (JP); Hideaki Moriya, Tokyo (JP)

(73) Assignees: KOBELCO CONSTRUCTION MACHINERY CO., LTD., Hiroshima-shi (JP); SINFONIA TECHNOLOGY CO., LTD., Minato-ku (JP)

( * ) Notice: Subject to any disclaimer, the term of this patent is extended or adjusted under 35 U.S.C. 154(b) by 0 days.

(21) Appl. No.: 14/289,760

(22) Filed: May 29, 2014

(65) Prior Publication Data
US 2014/0354191 A1    Dec. 4, 2014

(30) Foreign Application Priority Data

May 30, 2013 (JP) ................................. 2013-113976

(51) Int. Cl.
*H02P 6/00* (2006.01)
*H02P 27/08* (2006.01)

(52) U.S. Cl.
CPC .............. *H02P 6/002* (2013.01); *H02P 27/085* (2013.01)

(58) Field of Classification Search
CPC ....................................... H02P 6/002
USPC ............................ 318/3, 400.17, 400.01, 700
See application file for complete search history.

(56) References Cited

U.S. PATENT DOCUMENTS 7,456,597 B2 * 11/2008 Kanamori .................... 318/599
(Continued)

FOREIGN PATENT DOCUMENTS

DE    10 2011 003 559 A1    8/2012
EP        2 366 837 A2        9/2011
(Continued)

OTHER PUBLICATIONS

Extended European Search Report issued Aug. 6, 2015 in Patent Application No. 14168574.3.

*Primary Examiner* — David S Luo
(74) *Attorney, Agent, or Firm* — Oblon, McClelland, Maier & Neustadt, L.L.P.

(57) ABSTRACT

An object of the present invention is to provide an inverter device for driving an electric motor, which allows control stability and efficiency to be ensured over a wide region of the speed of the electric motor. The inverter device includes a rotational-speed detection section which detects a rotational speed of the electric motor, a carrier-frequency calculation section which calculates a carrier frequency on the basis of the detected rotational speed, and a carrier-frequency switching section which switches, on the basis of the calculated carrier frequency, the carrier frequency used for performing PWM control on the electric motor. The carrier-frequency calculation section calculates, as the carrier frequency, a frequency increased with an increase in the electric-motor rotational speed detected by the rotational-speed detection section.

10 Claims, 4 Drawing Sheets

(56) References Cited

U.S. PATENT DOCUMENTS

| | | | |
|---|---|---|---|
| 7,719,216 B2 * | 5/2010 | Sato | H02P 6/165 318/139 |
| 7,923,961 B2 * | 4/2011 | Takamatsu et al. | 318/811 |
| 8,405,328 B2 * | 3/2013 | Komiyama et al. | 318/369 |
| 2009/0115362 A1 | 5/2009 | Saha et al. | |
| 2010/0185350 A1 | 7/2010 | Okamura et al. | |

FOREIGN PATENT DOCUMENTS

| | | |
|---|---|---|
| EP | 2 366 837 A3 | 9/2011 |
| JP | 2002-125362 A | 4/2002 |
| JP | 2006-731 A | 1/2006 |
| JP | 2006-333572 A | 12/2006 |
| JP | 2009-284719 A | 12/2009 |
| JP | 2009-291019 A | 12/2009 |

* cited by examiner

(12) United States Patent
US 9,276,508 B2

INVERTER DEVICE FOR DRIVING ELECTRIC MOTOR

BACKGROUND OF THE INVENTION

1. Field of the Invention

The present invention relates to an inverter device for driving an electric motor, which drives an electric motor provided in a construction machine or the like on the basis of a PWM control scheme.

2. Description of the Related Art

In a conventional inverter device for driving an electric motor, a carrier frequency that determines a pulse width modulation period for pulse width modulation (PWM) control is generally set to a value that enables control stability at the maximum rotational speed of the electric motor to be secured, being constant regardless of changes in the rotational speed of the electric motor (this technique is hereinafter referred to as a first known technique).

On the other hand, there is also known a technique which involves changing the carrier frequency in accordance with a certain element. For example, Japanese Patent Application Laid-open No. 2009-291019 discloses changing the carrier frequency in accordance with a voltage instruction value, or output torque, which technique is hereinafter referred to as a second known technique. According to the second known technique, a higher carrier frequency is set for a region of higher output torques while a lower carrier frequency is set for a region of lower output torques. This enables a reduction both in current ripple and in switching loss to be expected.

According to the first known technique, the carrier frequency needed in terms of control stability is high in a speed region where the electric motor rotates at high speed and decreases with the decrease in the rotational speed of the electric motor. Thus, the first known technique involves higher carrier frequency than necessary in a low speed region, thereby increasing the switching loss with decreasing rotational speed of the electric motor and reducing inverter efficiency.

On the other hand, the second known technique takes no account into the electric-motor rotational speed in connection with changes in carrier frequency. Hence, in the case where a large torque is required in the low speed region, there cannot be obtained a high inverter efficiency, and in the case of a small torque is required in a high speed region, there cannot be obtained an excellent control stability.

SUMMARY OF THE INVENTION

An object of the present invention is to provide an inverter device for driving an electric motor, which allows both control stability and efficiency to be ensured over a wide region of speeds of the electric motor. The inverter device provided by the present invention includes a PWM-waveform generation section which generates a waveform for performing PWM control on the electric motor, a rotational-speed detection section which detects a rotational speed of the electric motor, a carrier-frequency calculation section which calculates a carrier frequency on the basis of the detected rotational speed, and a carrier-frequency switching section which switches the carrier frequency of the waveform generated by the PWM-waveform generation section, on the basis of the calculated carrier frequency. The carrier-frequency calculation section calculates, as the carrier frequency, a frequency which is increased with increase in the electric-motor rotational speed detected by the rotational-speed detection section.

DESCRIPTION OF THE PREFERRED EMBODIMENTS

A first embodiment of the present invention will be described with reference to FIG. 1 to FIG. 5. A term "inverter device" as used herein refers to an entire electric-motor driving control system including a narrowly-defined inverter that performs DC/AC conversions based on switching and a control unit which outputs control signals for PWM control to the inverter.

Figure 1:
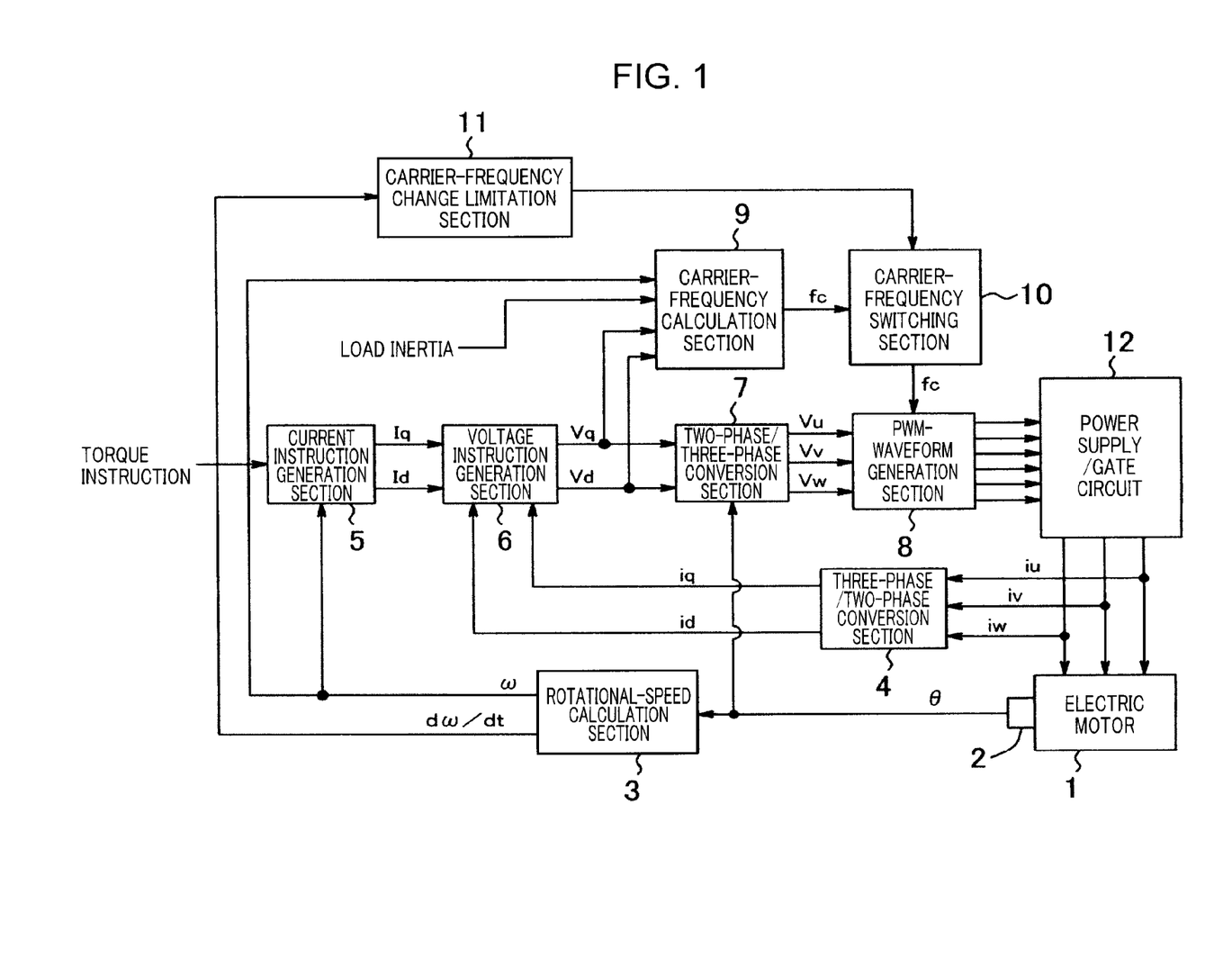
FIG. 1 is a block diagram of an inverter device according to a first embodiment of the present invention.

FIG. 1 shows a system configuration for an inverter device according to the first embodiment. The inverter device, which is configured to drive an electric motor 1, includes a rotation-angle detector 2, a rotational-speed calculation section 3, three-phase/two-phase conversion section 4, a current-instruction generation section 5, a voltage-instruction generation section 6, a two-phase/three-phase conversion section 7, a PWM-waveform generation section 8, a carrier-frequency calculation section 9, a carrier-frequency switching section 10, and a carrier-frequency switching limitation section 11.

The rotation-angle detector 2 includes, for example, a resolver to detect the rotation angle θ of the electric motor 1 to be driven. The rotational-speed calculation section 3 calculates an electric-motor rotational speed ω from the rotation angle θ detected by the rotation-angle detector 2.

The three-phase/two-phase conversion section 4 converts three phase currents iu, iv, and iw into a d-axis current id and a q-axis actual current iq on the basis of the electric-motor-rotation angle θ. The current-instruction generation section 5 outputs a d-axis current instruction Id and a q-axis current instruction Iq on the basis of a torque instruction and the electric-motor rotational speed ω. The voltage-instruction generation section 6 calculates a d-axis voltage instruction Vd and a q-axis voltage instruction Vq on the basis of both d-axis current id and q-axis actual current iq and both d-axis current instruction Id and a q-axis current instruction Iq. The two-phase/three-phase conversion section 7 converts the d-axis voltage instruction Vd and the q-axis voltage instruction Vq into three phrase voltages Vu, Vv, and Vw on the basis of the electric-motor-rotation angle θ.

The PWM-waveform generation section 8 generates a PWM pulse (PWM waveform=switching signal) on the basis of a comparison of the phase voltages Vu, Vv, and Vw with a carrier signal. The carrier-frequency calculation section 9 calculates the carrier frequency on the basis of a plurality of elements. The carrier-frequency switching section 10 switches the carrier frequency of a PWM pulse generated by the PWM-waveform generation section 8 on the basis of the carrier frequency calculated by the carrier-frequency calculation section 9.

The rotational-speed calculation section 3 also serves as a rotational-angular acceleration calculation section which calculates the rotational angular acceleration of the electric motor 1. The carrier-frequency switching limitation section 11 determines whether or not the carrier frequency should be permitted to be switched, on the basis of the rotational angular acceleration (dω/dt) of the electric motor 1 determined on the basis of the rotational speed calculated by the rotational-speed calculation section 3. Specifically, when the rotational angular acceleration of the electric motor 1, i.e., a change in speed, reaches a set value or greater, the carrier-frequency switching limitation section 11 determines that the carrier frequency should not be changed because a rapid change in speed has been made, thus inputting, to the carrier-frequency switching section 10, a frequency switching limitation instruction to prohibit the carrier-frequency switching section 10 from a frequency switching process in accordance with the electric motor speed to make the carrier-frequency switching section 10 fix the carrier frequency to, for example, a value which enables control stability to be ensured at the maximum rotational speed of the electric motor 1.

Figure 2:
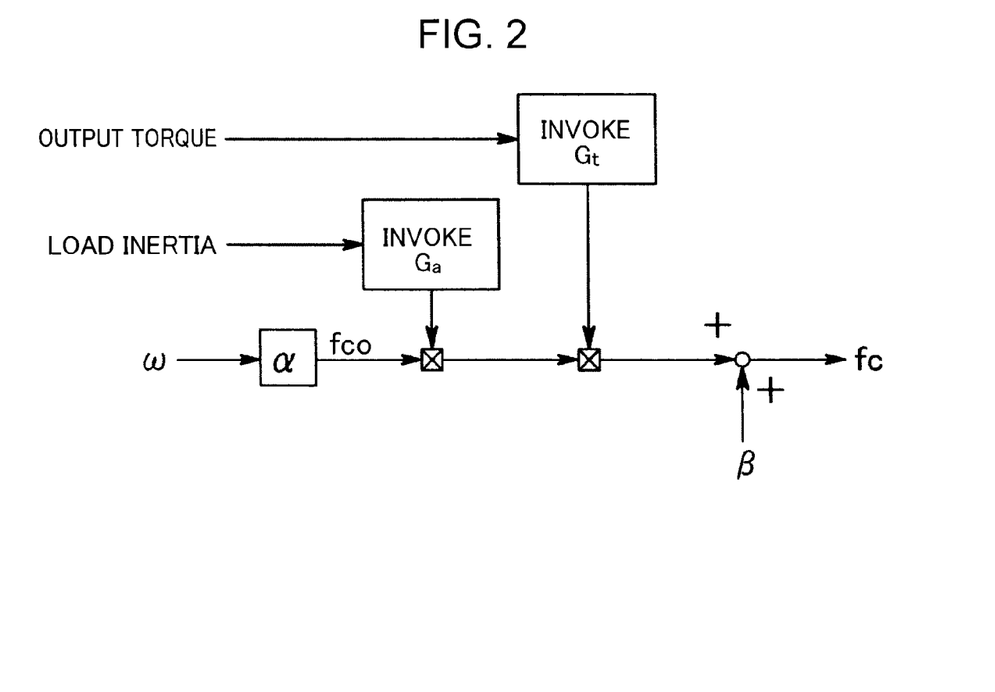
FIG. 2 is a block diagram showing the contents of processing executed by a carrier-frequency calculation section of the inverter device.

The carrier-frequency calculation section 9 calculates the carrier frequency on the basis of the electric-motor rotational speed w, a load inertia detected by an inertia detector (not shown in the drawings) and an output torque output from the voltage-instruction generation section 6. Specifically, the carrier-frequency calculation section 9 calculates the carrier frequency fc on the basis of the following formula.

$$fc = \alpha \times Gt \times Ga \times \omega + \beta$$

wherein α: a gain for switching of the carrier frequency in a steady state,

Gt: a gain depending on the output torque (see FIG. 4),
Ga: a gain depending on the load inertia (see FIG. 5),
ω: the electric-motor rotational speed, and
β: the carrier frequency in a state of locking the electric motor.

Figure 3:
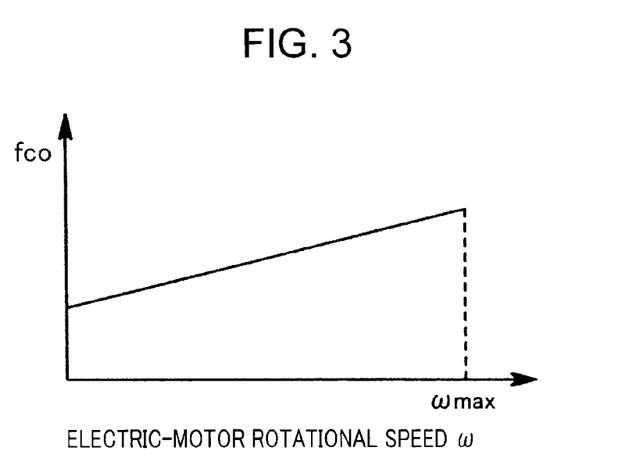
FIG. 3 is a diagram showing a preset characteristic for a relation between an electric-motor rotational speed and a speed gain in the inverter device.
Figure 4:
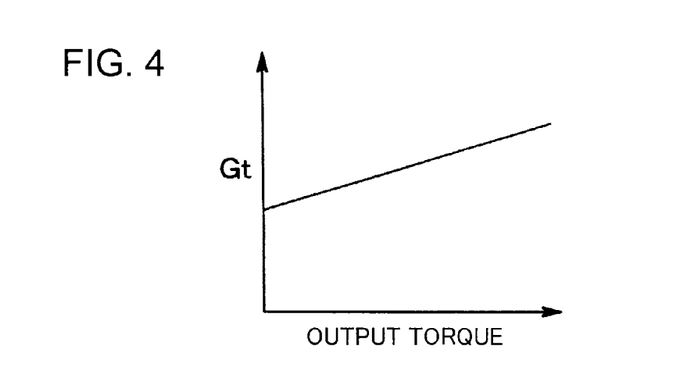
FIG. 4 is a diagram showing a relation between an output torque from the inverter device and a gain for calculation of a carrier frequency.
Figure 5:
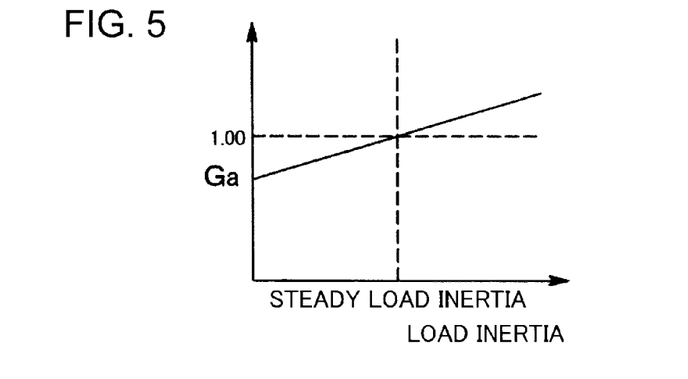
FIG. 5 is a diagram showing a relation between a load inertia and the gain for calculation of the carrier frequency in the inverter device.

FIG. 3 shows a relationship between the electric-motor rotational speed ω and a fundamental carrier frequency fco to be determined in association with the electric-motor rotational speed ω. As shown in FIG. 3, the gain α is set so as to maximize the fundamental carrier frequency fco at an electric motor maximum rotational speed ωmax and decreases it in proportion to a decrease in the rotational speed. In other words, the carrier-frequency calculation section 9 performs: pre-storing, as a frequency characteristic, the most suitable relationship between the electric-motor rotational speed ω and the fundamental carrier frequency fco for establishing both control stability and inverter efficiency; calculating the fundamental carrier frequency fco for each speed on the basis of the frequency characteristic; and finally calculating the actual carrier frequency fc by incorporating the output torque and the load inertia into the fundamental carrier frequency fco. In this case, the output torque gain Gt shown in FIG. 4 and the load inertia gain Ga shown in FIG. 5 are set so as to be increased with the increase in the output torque and load inertia, respectively.

In the case where the carrier-frequency switching limitation section 11 permits the carrier frequency to be switched, the carrier-frequency switching section 10 outputs the carrier frequency fc determined by the carrier-frequency calculation section 9 to the PWM-waveform generation section 8. Upon receiving the output, the PWM-waveform generation section 8 generates a PWM waveform (a pulse) corresponding to the carrier frequency fc and inputs the PWM waveform to a power supply/gate circuit 12, a narrowly-defined inverter. The power supply/gate circuit 12 inputs an AC voltage based on the PWM waveform into the electric motor 1.

In this inverter device, performed is changing the carrier frequency so as to reduce the carrier frequency on a low speed side throughout the entire speed region in accordance with the electric-motor rotational speed as described above, with focus placed on the following two points: the required carrier frequency for ensuring control stability is decreased with decrease in the electric-motor rotational speed; and the lower carrier frequency involves a less inverter loss (a switching loss) to thus increase inverter efficiency. This enables both control stability and efficiency to be achieved throughout the entire speed region.

Besides, the inverter device determines the actual carrier frequency fc by multiplying the fundamental carrier frequency fco determined from the electric-motor rotational speed by the gains Gt and Ga depending on the output torque of the electric motor and the load inertia. In other words, the actual carrier frequency fc is determined by taking into account the operating status of a machine provided with the electric motor 1. This allows preferable machine operations to be achieved. For example, when the load inertia or the output torque is great, there is performed a determination of the carrier frequency with priority given to the inverter efficiency, because a certain amount of fluctuation in torque involves no shock (no degradation of the control stability). On the other hand, when the load inertia or the output torque is low to make the response of the machine operation sensitive to a fluctuation in torque, the carrier frequency is gradually changed to thereby suppress a possible shock.

Moreover, when the rotational angular acceleration (dω/dt) exceeds a set value, the carrier-frequency switching limitation section 11 stops switching the carrier frequency. In other words, when the change in the speed of the electric motor is significant, the carrier-frequency switching limitation section 11 prohibits the carrier frequency from being switched. This allows the control to be stabilized.

Figure 6A:
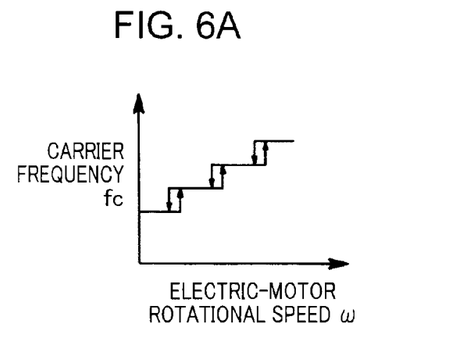
FIG. 6A is a diagram showing a relation between the electric-motor rotational speed and the carrier frequency which relation is used to change the carrier frequency in a step-by-step manner according to a second embodiment of the present invention.
Figure 6B:
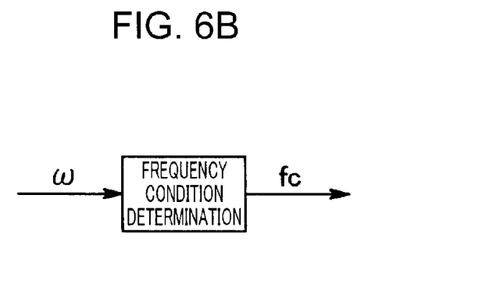
FIG. 6B is a block diagram showing processing executed by a carrier-frequency switching section according to the second embodiment.

Next will be described a second embodiment of the present invention with reference to FIG. 6A and FIG. 6B.

According to the second embodiment, the total region of the electric-motor rotational speed is divided into a plurality of speed zones. Although the inverter device according to the second embodiment includes the same components as those of the inverter device according to the first embodiment, the carrier-frequency switching section 10 among of them is configured to switch the carrier frequency in a step-by-step manner for each of the speed zones. Specifically, the carrier-frequency switching section 10 pre-stores a plurality of carrier frequencies fc provided for respective zones of the electric-motor rotational speed as shown in FIG. 6A, and invokes one of the plurality of carrier frequencies fc, the invoked one corresponding to a speed zone to which the detected electric-motor rotational speed ω belongs, to output it, as "frequency condition determination" shown in FIG. 6B. Besides, according to the second embodiment, such hysteresis as shown in FIG. 6A is applied to the step-by-step switching of the carrier frequency.

According to the second embodiment, the carrier frequency can be determined by use of a little calculation and the control is facilitated, compared to the case of consecutively calculating the carrier frequency for each of all the electric-motor rotational speeds to switch it. Furthermore, the application of the hysteresis to the switching of the carrier frequency suppresses possible chattering near each switching point to enable smooth control to be performed.

Figure 7:
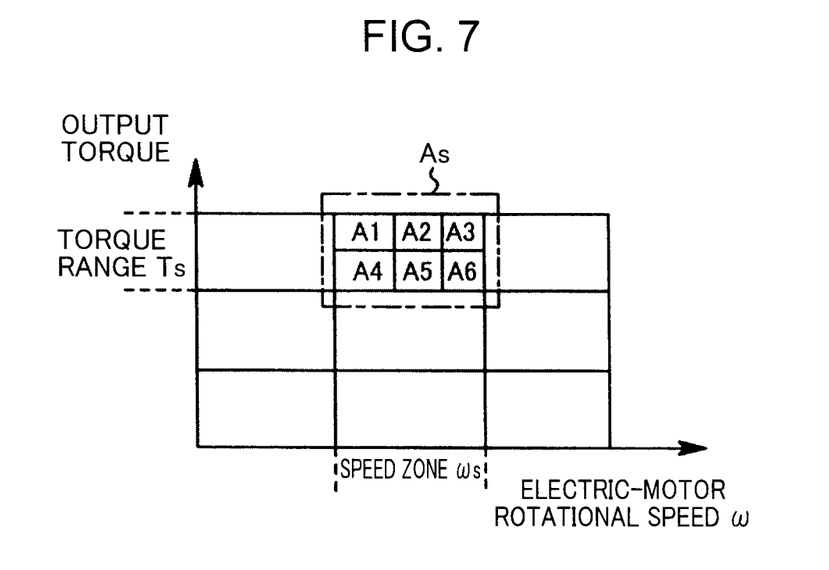
FIG. 7 is a diagram showing a relation between the electric-motor rotational speed and the output torque according to a third embodiment of the present invention.

A third embodiment of the present invention will be described with reference to FIG. 7.

According to the third embodiment, a region of the electric-motor rotational speed with a high output frequency is preset to be a high-frequency output region, in which the carrier frequency is switched more finely than in the other regions. Specifically, FIG. 7 shows a case of frequent use of the electric-motor rotational speed and output torque in a region As corresponding to a certain speed zone ωs and a certain torque region Ts, in which case the region As is subdivided into a plurality of use regions A1 to A6 and the carrier-frequency calculation section 9 stores a plurality of carrier frequencies assigned to the use regions A1 to A6, respectively, and switches among the carrier frequencies. This allows control in a frequently used region to be further stabilized and enables efficiency to be enhanced.

Figure 8:
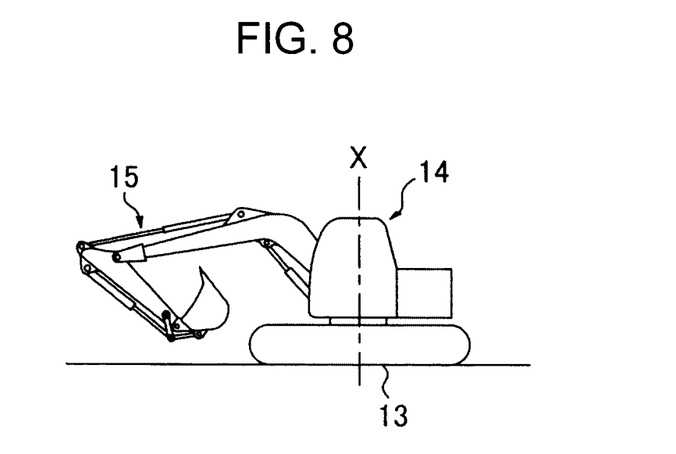
FIG. 8 is a schematic side view of an excavator with a slewing electric motor mounted therein which is an example of a driving target of the inverter device according to the present invention.

The inverter device according to the present invention is applicable to driving of various electric motors, being particularly useful for driving an electric motor for a construction machine. FIG. 8 shows an excavator, an example of a slewing-type construction machine equipped with the inverter device according to the present invention and a slewing electric motor to be driven by the inverter device. The excavator includes a lower traveling body 13 of a crawler type, an upper slewing body 14 mounted on the lower traveling body 13 so as to be slewable around an axis X perpendicular to the ground, a front attachment 15 attached to the upper slewing body 14 to perform operations such as excavation, and a not-graphically-shown slewing electric motor which slews the upper slewing body. The slewing electric motor is driven by the inverter device according to the present invention.

In this excavator or various slewing construction machines configured by replacing the excavator or the front attachment 15 thereof with another excavator or attachment, slewing speed frequently changes over a wide speed region from low speed to high speed, and therefore switching the carrier frequency depending on changes in the speed of the slewing electric motor allows a high energy saving effect to be achieved.

The present invention is not limited to the embodiments. For example, although, in the first embodiment, the carrier frequency determined from the electric-motor rotational speed is multiplied by the gains depending on the load inertia and the output torque to calculate the actually used carrier frequency, the carrier frequency determined from the electric-motor rotational speed may be multiplied by the gain depending on only one of either the load inertia or the output torque.

Although the first embodiment sets the fundamental carrier frequency fco changing linearly at a constant gradient with respect to the electric-motor rotational speed ω as shown in FIG. 3, the specific relationship between the electric-motor rotational speed ω and the fundamental carrier frequency fco is not limited. For example, the relationship between the electric-motor rotational speed ω and the fundamental carrier frequency fco may be expressed by polygonal lines corresponding to a combination of a plurality of lines with different gradients.

As described above, the present invention provides an inverter device for driving an electric motor, which allows both control stability and efficiency to be ensured over a wide region of speeds of the electric motor. This inverter device includes a PWM-waveform generation section which generates a waveform for performing PWM control on the electric motor, a rotational-speed detection section which detects a rotational speed of the electric motor, a carrier-frequency calculation section which calculates a carrier frequency on the basis of the detected rotational speed, and a carrier-frequency switching section which switches the carrier frequency of the waveform generated by the PWM-waveform generation section, on the basis of the calculated carrier frequency. The carrier-frequency calculation section calculates, as the carrier frequency, a frequency which is increased with increase in the electric-motor rotational speed detected by the rotational-speed detection section.

In this inverter device, calculated is a carrier frequency which is decreased with decrease in the electric-motor rotational speed throughout the entire speed region, with focus placed on the following two points: (i) the required carrier frequency for ensuring control stability is decreased with decrease in the electric-motor rotational speed; and (ii) the lower carrier frequency involves a less inverter loss (a switching loss) to thus increase inverter efficiency. This enables both stabilization of control and improvement of efficiency to be achieved over a wide region, preferably over the entire region of the electric-motor rotational speed.

In actuality, it is preferable that the carrier-frequency calculation section pre-stores the most suitable frequency characteristic for ensuring both control stability and inverter efficiency, that is, the relationship between the electric-motor rotational speed and the carrier frequency, and determines the carrier frequency for each speed (or each speed region) on the basis of the frequency characteristic.

Specifically, the carrier-frequency calculation section preferably calculates the fundamental carrier frequency on the basis of the electric-motor rotational speed, and calculates the carrier frequency to be actually used by multiplying the fundamental carrier frequency by the gain depending on at least one of an output torque from the electric motor and a load inertia. Thus determining the actual carrier frequency taking into account the output torque or load inertia, which is indicative of the operating status of the machine with the electric motor mounted therein, enables preferable machine operation to be achieved. For example, when the load inertia or the output torque is so high as to involve no shock even with a certain amount of fluctuation in torque, that is, involve no degradation of the control stability, the carrier frequency is determined with priority given to the inverter efficiency. On the other hand, when the load inertia or the output torque is so low as to make the response of machine operation to a fluctuation in torque be sensitive, gradually changing the carrier frequency allows a possible shock to be suppressed.

Preferably, the inverter device according to the present invention further includes a rotational-angular-acceleration calculation section which calculates the rotational angular acceleration of the electric motor, and a carrier-frequency switching limitation section that stops frequency switching performed by the carrier-frequency switching section when the rotational angular acceleration calculated by the rotational-angular-acceleration calculation section exceeds a set value. Thus limiting the switching of the carrier frequency in the case of significant change in the speed of the electric motor enables more stable control to be achieved.

The carrier-frequency calculation section preferably switches the carrier frequency more finely in a high-frequency output region that involves a higher output frequency than in the other regions in the relationship between the electric-motor rotational speed and an inverter output. This enables the stability and efficiency of control in a frequently used region to be enhanced.

On the other hand, the carrier-frequency switching section preferably switches the carrier frequency in a step-by-step manner for each of a plurality of zones obtained by dividing an entire region of the electric-motor rotational speed in advance. The step-by-step switching of the carrier frequency makes it possible to determine the carrier frequency with a little calculation to facilitate control, compared to the case of consecutively calculating the carrier frequency for each of all the electric-motor rotational speeds and switching it.

In this case, it is preferable that hysteresis is applied to the step-by-step switching of the carrier frequency performed by the carrier-frequency switching section. The application of the hysteresis suppresses possible chattering near each switching point to enable smooth control to be performed.

The present invention also provides a slewing-type construction machine including a lower traveling body, an upper slewing body mounted on the lower traveling body so as to be slewable, a slewing electric motor which clews the upper slewing body, and the inverter device used to drive the slewing electric motor.

In such a slewing-type construction machine, where slewing speed frequently changes over a wide speed region from low speed to high speed, switching the carrier frequency depending on changes in the speed of the slewing electric motor produces a high energy saving effect. This application is based on Japanese Patent application No. 2013-113976 filed in Japan Patent Office on May 30, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An inverter device for driving an electric motor, comprising:
   a PWM-waveform generation section which generates a waveform for performing PWM control on the electric motor;
   a rotational-speed detection section which detects a rotational speed of the electric motor;
   a carrier-frequency calculation section which calculates a carrier frequency on the basis of the rotational speed detected by the rotational-speed detection section; and
   a carrier-frequency switching section which switches the carrier frequency of the waveform generated by the PWM-waveform generation section, on the basis of the calculated carrier frequency,
   wherein the carrier-frequency calculation section calculates, as the carrier frequency, a frequency which is increased with an increase in the electric-motor rotational speed detected by the rotational-speed detection section, and
   wherein the carrier-frequency calculation section calculates a fundamental carrier frequency on the basis of the electric-motor rotational speed and calculates a carrier frequency to be actually used by multiplying the fundamental carrier frequency by a gain depending on at least one of an output torque from the electric motor and a load inertia.

2. A slewing construction machine comprising:
   a lower traveling body;
   an upper slewing body mounted on the lower traveling body so as to be slewable;
   a slewing electric motor which slews the upper slewing body; and
   the inverter device according to claim 1, which is used to drive the slewing electric motor.

3. A slewing construction machine comprising: a lower traveling body; an upper slewing body mounted on the lower traveling body so as to be slewable; a slewing electric motor which slews the upper slewing body; and the inverter device according to claim 1, which is used to drive the slewing electric motor; and a rotational-angular-acceleration calculation section which calculates a rotational angular acceleration of the electric motor and a carrier-frequency switching limitation section which stops frequency switching performed by the carrier-frequency switching section when the rotational angular acceleration calculated by the rotational angular-acceleration calculation section exceeds a set value.

4. A slewing construction machine comprising: a lower traveling body; an upper slewing body mounted on the lower traveling body so as to be slewable; a slewing electric motor which slews the upper slewing body; and the inverter device according to claim 1, which is used to drive the slewing electric motor wherein the carrier-frequency calculation section switches the carrier frequency more finely in a high-frequency output region that involves a higher output frequency than in the other regions in the relationship between the electric-motor rotational speed and an inverter output.

5. A slewing construction machine comprising: a lower traveling body, an upper slewing body mounted on the lower traveling body so as to be slewable; a slewing electric motor which slews the upper slewing body; and the inverter device according to claim 1, which is used to drive the slewing electric motor wherein the carrier-frequency switching section switches the carrier frequency in a step-by-step manner for each of a plurality of zones obtained by dividing an entire region of the electric-motor rotational speed in advance.

6. The slew construction machine according to claim 5, wherein hysteresis is applied to the step-by-step switching of the carrier frequency performed by the carrier-frequency switching section.

7. An inverter device for driving an electric motor, comprising:
   a PWM-waveform generation section which generates a waveform for performing PWM control on the electric motor;
   a rotational-speed detection section which detects a rotational speed of the electric motor;
   a carrier-frequency calculation section which calculates a carrier frequency on the basis of the rotational speed detected by the rotational-speed detection section;
   a carrier-frequency switching section which switches the carrier frequency of the waveform generated by the PWM-waveform generation section, on the basis of the calculated carrier frequency; and
   a rotational-angular-acceleration calculation section which calculates a rotational angular acceleration of the electric motor and a carrier-frequency switching limitation section which stops frequency switching performed by the carrier-frequency switching section when the rotational angular acceleration calculated by the rotational angular-acceleration calculation section exceeds a set value, wherein the carrier-frequency calculation section calculates, as the carrier frequency, a frequency which is increased with an increase in the electric-motor rotational speed detected by the rotational-speed detection section.

8. An inverter device for driving an electric motor, comprising:

a PWM-waveform generation section which generates a waveform for performing PWM control on the electric motor;

a rotational-speed detection section which detects a rotational speed of the electric motor;

a carrier-frequency calculation section which calculates a carrier frequency on the basis of the rotational speed detected by the rotational-speed detection section; and a carrier-frequency switching section which switches the carrier frequency of the waveform generated by the PWM-waveform generation section, on the basis of the calculated carrier frequency, wherein the carrier-frequency calculation section calculates, as the carrier frequency, a frequency which is increased with an increase in the electric-motor rotational speed detected by the rotational-speed detection section, and wherein the carrier-frequency calculation section switches the carrier frequency more finely in a high-frequency output region that involves a higher output frequency than in the other regions in the relationship between the electric-motor rotational speed and an inverter output.

9. An inverter device for driving an electric motor, comprising:

a PWM-waveform generation section which generates a waveform for performing PWM control on the electric motor;

a rotational-speed detection section which detects a rotational speed of the electric motor;

a carrier-frequency calculation section which calculates a carrier frequency on the basis of the rotational speed detected by the rotational-speed detection section; and a carrier-frequency switching section which switches the carrier frequency of the waveform generated by the PWM-waveform generation section, on the basis of the calculated carrier frequency, wherein the carrier-frequency calculation section calculates, as the carrier frequency, a frequency which is increased with an increase in the electric-motor rotational speed detected by the rotational-speed detection section, and wherein the carrier-frequency switching section switches the carrier frequency in a step-by-step manner for each of a plurality of zones obtained by dividing an entire region of the electric-motor rotational speed in advance.

10. The inverter device according to claim 9, wherein hysteresis is applied to the step-by-step switching of the carrier frequency performed by the carrier-frequency switching section.

* * * * *